UNITED STATES PATENT OFFICE.

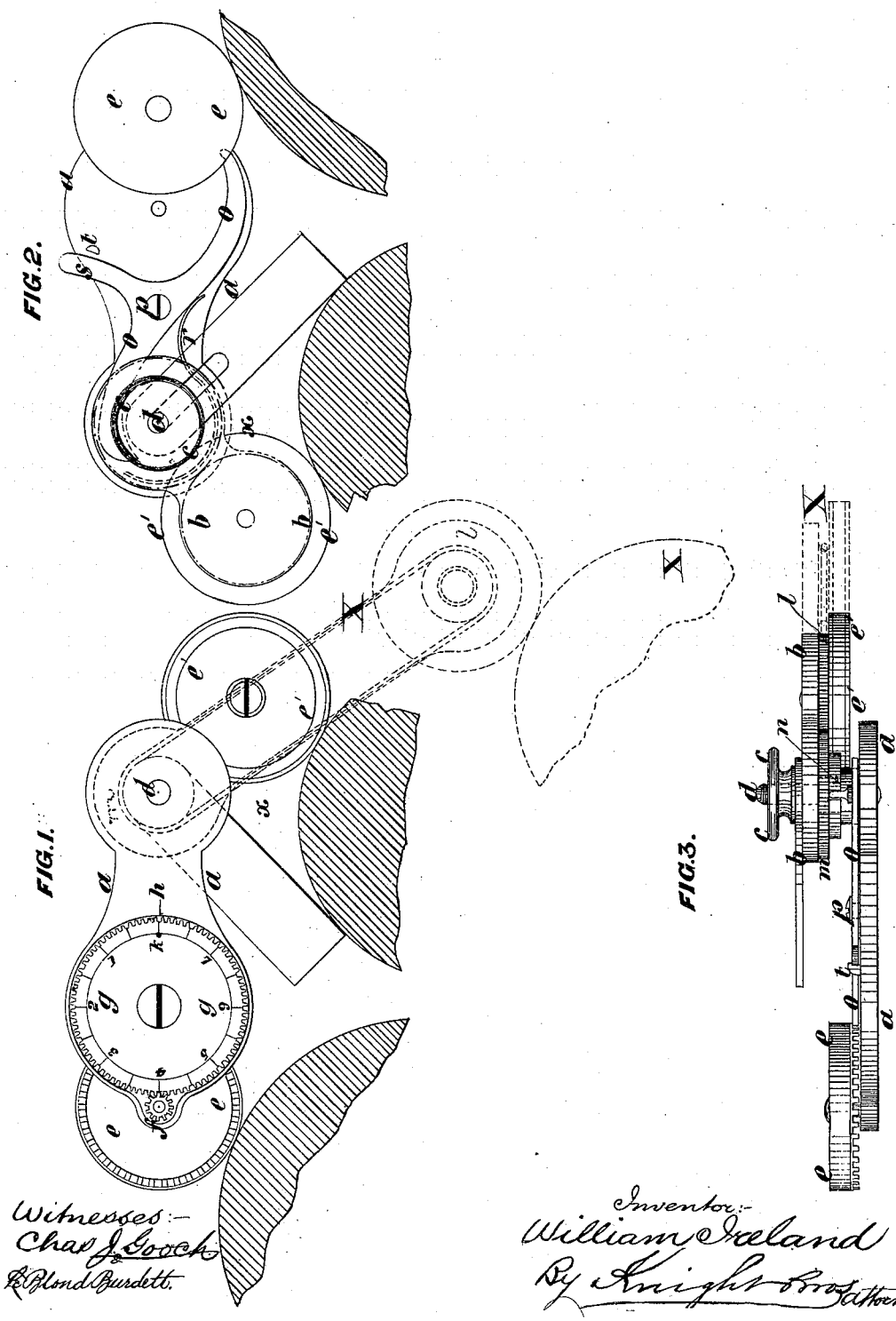

WILLIAM IRELAND, OF BUCKHAVEN, NORTH BRITAIN.

IMPROVEMENT IN ROTARY-SPEED MEASURES.

Specification forming part of Letters Patent No. 193,707, dated July 31, 1877; patented in England, March 30, 1876, for fourteen years; application filed April 12, 1877.

*To all whom it may concern:*

Be it known that I, WILLIAM IRELAND, of Buckhaven, in the county of Fife, North Britain, have invented an instrument for indicating or ascertaining the absolute and relative speed of revolving or other moving surfaces, the same being especially applicable for ascertaining the draft in preparing or spinning machinery and for measuring the delivery or uptake of slivers or yarns, of which the following is a specification:

This invention relates to certain improvements on instruments for measuring and indicating the absolute and relative speed or rate of motion of the surface of rollers, shafts, and other rotating or moving bodies.

The improved instrument is adapted for use upon mechanism generally in which such rotating bodies exist, and it is especially applicable to machinery for preparing and spinning yarns.

The invention consists in the use of two arms or bars, which are jointed together at one end to admit of the free movement of their other ends, and are held in the desired position by a pinching-nut.

At the free end of each arm rollers are so carried as to be free to rotate upon their axes. On the axis of one of these rollers a spur-pinion is fixed which gears with a wheel or indicating-dial fixed in one of the arms or bars.

Two wheels meshing with each other or otherwise arranged to act in unison, serve to transmit motion to the roller carrying the spur-pinion.

On one side of one of these wheels is a clutch box or disk, having a notch or recess cut in its periphery. Into this notch one end of a pawl or stop enters, the other end entering the teeth of the roller carrying the spur-pinion. This pawl is kept in proper position by the pressure of a spring, which is fixed to the rearward end of the arm or bar carrying the indicating-dial.

Figure 1 is an elevation of one side of the instrument constituting my said invention. Fig. 2 is an elevation of its opposite side, and Fig. 3 a plan of the instrument, which, as seen by these figures, consists of two arms or bars, $a$ and $b$, jointed together at one end in such a manner that their opposite ends are free to be moved toward and from one another, the said bars being retained at the desired position by a pinching-nut, $c$, screwed on a stud, $d$, fixed in the arm or bar $a$, and passing through the arm or bar $b$, as more particularly seen at Fig. 3.

At the free end of each arm or bar of the instrument rollers $e\ e'$ are so carried as to be free to rotate upon their axes.

These rollers may each be of the same size, or their diameters, and therefore their peripheries, may bear any desired ratio to one another according to the size of the instrument and the purpose for which it is to be employed.

On the axis of one of the rollers $e$ a spur-pinion, $f$, is fixed and geared with a corresponding wheel, $g$, carried on a stud fixed in the arm or bar $a$, which is recessed to admit of the wheel $g$ being placed flush with the side of it.

The outer side of the wheel $g$ is divided into parts, so as to constitute an indicator-dial for which a notch or line cut or marked on the arm $a$, at $h$, serves as a finger or pointer. A small knob or pin, $k$, fixed in the wheel $g$, denotes the position of zero.

In the drawing the relation of the pinion $f$ to the wheel $g$ is as one to eight, so that the said wheel makes one complete revolution for every eight revolutions of the roller $e$; but instead of this any other desired relative speed of the said wheel and roller may be established.

The roller $e'$ carried on the outer end of the arm or bar $b$, has a spur-wheel, $l$, formed on it, or firmly placed on the same axis or stud with it, as seen at Fig. 3 of the drawings, and the said wheel $l$ is geared with a corresponding wheel, $m$, placed loosely on the pin or stud $d$, hereinbefore referred to. On one side of the latter wheel a clutch box or disk with a notch or recess cut in its periphery is formed, as seen at $n$, Fig. 3. Into this notch or recess one end of a pawl or stop, $o$, centered on a pin or stud, $p$, screwed or otherwise fixed into the arm or bar $a$, enters, the other extremity of the said pawl or stop entering between the teeth, which are shown at Figs. 1 and 3, as made in the roller $e$.

A spring, $r$, Fig. 2, which is fixed at the rearward end of the arm or bar $a$, bears against the pawl or stop, and has the tendency to keep the extremities thereof in gear with the wheel *m* and roller *e*.

The rollers *e* and *e′*, as shown in the drawings, are of the same size; but, if desired, rollers of different sizes may be used, and the periphery of one or each of these rollers is, or may in some cases be, provided with a ring of india-rubber or other elastic material, in order to give greater frictional contact with the rotating or moving bodies whose absolute or relative speeds are being ascertained.

The wheels *l* and *m* are also the same size; but under a modified form of the instrument pulleys with an endless band of catgut, leather, cord, or other equivalent material may be substituted for such wheels.

This latter arrangement, which is indicated by the dotted lines, at X, Figs. 1 and 3, permits of the instrument being made much larger, as with it the arm *b*, carrying the roller *e′*, may be indefinitely extended, thereby rendering the instrument applicable for employment upon mechanism whose rotating or moving bodies are comparatively wide apart.

Under either of the above arrangements, by placing the roller *e* in contact with the rotating part, whose relative speed of surface-motion to the surface-motion of the part in contact with the roller *e′* it is desired to ascertain, that relation or ratio is at once seen by the arc of rotation through which the dial *g* has moved from the position of zero, to which, previous to observing with the instrument, it had been adjusted opposite to the index or pointer *h*.

In taking an observation it is essential that the rollers *e* and *e′* be set in rotation at the same instant.

To enable this to be done with all the accuracy desirable is part of the function of the pawl or stop *o* and spring *r*, the said pawl or stop being released from the rollers *e* and *e′* simultaneously by pressing with the finger the part *s* of the pawl against the knob *t* after the rollers *e e′* have been adjusted in frictional contact with the rotating parts of the machine, or while they are being so adjusted. The spring *r* again forces the pawl into the notch or slot of the wheel *m*, (or of the pulley when such is substituted for the wheel,) and also into the teeth of the roller *e*, thereby simultaneously stopping their motion at the termination of each complete revolution of the roller *e′*. By then looking at the dial *g* it is ascertained how much more or less than one revolution the roller *e* has made.

The instrument is provided with a clamp or bracket, *x*, adjustable both radially on and to a greater or less distance outward from the pin or stud *d*, and the said clamp or bracket by bearing on a fixed or rotating part of the machine steadies the instrument while observing, as hereinbefore set forth.

The apparatus illustrated in the drawings is also applicable in the following manner for measuring the relative speed of two draft-rollers, such as are employed on spinning-frames: The roller *e* is placed in frictional contact with the drawing-roller, and the rove from the rove-bobbin is passed round the roller *e′*, from whence it is conducted to the retaining-roller. The apparatus being then set in motion, by releasing the pawl *o* from both rollers *e e′*, the roller *e′* is permitted to rotate through one revolution, being actuated by the retaining-roller and by the rove as by a belt or band, while the roller *e* is rotated by frictioned contact with the drawing-roller, whose surface rotation relatively with the retaining-roller is indicated by the dial *g*.

In some cases the instrument instead of being so used may have its rollers *e e′* applied directly to the surface of the drawing and retaining rollers of the spinning-frame.

A modification of the apparatus suitable for employment on spinning-frames is to dispense with arm *b* altogether, and center the roller *e′* at the rearward end of the arm *a*. In this case the wheels *l* and *m* (or pulleys substituted therefor) are also dispensed with, the rearward end of the pawl *o* acting in a notch or slot made in the boss of the roller *e′*.

The apparatus, as shown in the drawings, is also applicable to be used for measuring the length of yarns or fabrics passing through a machine in a given time by applying the roller *e* to the delivery-roller of the machine, and holding the finger in such a position that the knob *k* on the dial *g* will pass under and against it at each revolution of the indicator, the said revolution representing a given or known length of the material being measured.

When so used, the wheel *m*, or its equivalent, is turned so as to prevent the pawl or stop *o* from acting in the notch thereof, and consequently in the teeth of the roller *e*.

When employed for this or analogous purposes the apparatus may be modified so as to consist only of the arm or bar *a*, roller *e*, pinion *f*, and dial *g*, which modified construction may also be used to measure the absolute surface-speed of a rotating or moving body in a given time.

Having thus described my invention, the following is what I claim as new, and desire to secure by Letters Patent—

In a measuring and indicating instrument, the two arms or bars *a b*, jointed together at one end, the rollers *e e′* at their free ends, pinion *f*, indicating-dial *g*, wheels *l m*, pawl *o*, and spring *r*, substantially as and for the purposes set forth.

In witness whereof I have signed my name to this specification in the presence of two subscribing witnesses.

WILLIAM IRELAND. [L. S.]

Witnesses:
GEORGE MACAULEY CRUIKSHANK,
DAVID DRYSDALE AUSTIN.